United States Patent [19]

Welker

[11] 4,351,510
[45] Sep. 28, 1982

[54] FLOW REGULATOR ASSEMBLY

[76] Inventor: Robert H. Welker, P.O. Box 138, Sugar Land, Tex. 77478

[21] Appl. No.: 205,286

[22] Filed: Nov. 10, 1980

[51] Int. Cl.$^3$ ............................................. F16K 13/00
[52] U.S. Cl. .................................... 251/118; 138/46; 251/63.5
[58] Field of Search ......................... 137/219; 138/46; 251/63.5, 118, 356

[56] References Cited

U.S. PATENT DOCUMENTS

| 2,917,269 | 12/1959 | Welker | 251/63.5 |
| 3,015,469 | 1/1962 | Falk | 138/46 X |
| 3,368,787 | 2/1968 | Sachnik | 251/63.5 |
| 3,380,470 | 4/1968 | Culpepper | 251/63.5 X |
| 3,746,300 | 7/1973 | Welker | 251/63.5 |
| 4,206,902 | 6/1980 | Barthel | 251/63.5 Y |

Primary Examiner—Robert G. Nilson
Attorney, Agent, or Firm—Gunn, Lee & Jackson

[57] ABSTRACT

A flow regulator assembly is disclosed. In the preferred and illustrated embodiment, the flow regulator assembly incorporates a clamped transverse disk having an alignment lip thereabout, the disk supporting on the upstream side a centralized projection. The projection supports a resilient body which is expanded by axially compressing the body. It expands to regulate the gas flow in the annular space through the apparatus. Radial expansion narrows an annular flow space between the resilient body and the surrounding housing. A surrounding housing is obtained from the flange terminated pipeline immediately adjacent to the flow regulator.

4 Claims, 6 Drawing Figures

FLOW REGULATOR ASSEMBLY

BACKGROUND OF THE DISCLOSURE

This disclosure is directed to a flow regulator adapted to be installed in a pipeline. The flow regulator of the present invention regulates the pressure of natural gas. Typically, natural gas will be delivered through a pipeline at a relatively high rate of flow and at a relatively high pressure. For a localized distribution system, the pipeline pressure is reduced to enable the localized distribution system to operate more desirable levels.

The present inventor provided a very successful flow regulator which is shown in now expired U.S. Pat. No. 2,917,269. That flow regulator has worked well in the industry. The present invention is an improvement over that apparatus. This invention is a flow regulator which is adapted to be installed in a pipeline, incorporating a modified means of aligning and clamping the regulator between flanges. Further, it is modified by omitting a surrounding sleeve and utilizing the side wall of the pipe to function as the surrounding sleeve. To this end, the inside of the pipe is undercut slightly to define a constricting area adjacent to the expandable resilient plug.

The present disclosure is related to copending application, Ser. No. 205,287 filed on the same date as the present disclosure. That disclosure describes and sets forth a means of distributing the gas flow across the cross-sectional area of pipe downstream from the flow regulator. The flow, being distributed across the pipe, reduces noise and downstream turbulence. There is a tendency to form eddy currents in the downstream flume which is avoided by the apparatus disclosed and claimed in the copending application. The present apparatus further includes a transverse disk which is captured between flange plates of the pipeline wherein the disk is drilled with a plurality of openings to obtain the distribution of gas flow across the transverse section of the downstream area so that the feature found in the copending disclosure is also utilized in this structure.

One feature of the present disclosure is the distribution of the natural gas flow across the cross-sectional area to thereby reduce noise and reduce eddy flows downstream of the regulator, this apparatus achieving this with a flow regulator constructed from a resilient expandable plug positioned against the pipeline to define the annular flow space where regulation occurs.

Another important feature of the present invention is that construction cost is reduced by omitting an internal sleeve within the pipe. This sleeve is omitted, thereby modifying the construction techniques requires for fabrication of the flow regulator and further yielding a somewhat simplified construction.

These objects and advantages are obtained from the present apparatus which is summarized as a flow regulator supported on or from a transverse disk which is clasped between facing flanges in a pipeline. The pair of flanges clamp the disk positioned between them, the disk being constructed with an alignment lip for locking against a mating lip on the flanges. The disk supports, on the upstream face, a centralized elongate body which, in turn, supports a centered plug of resilient material. The resilient material defines a plug which swells or expands on the application of hydraulic pressure to axially load the plug. An annular flow space adjacent to the pipe is incorporated adjacent to the plug and regulation occurs in this flow space.

BRIEF DESCRIPTION OF THE DRAWINGS

So that the manner in which the above recited features, advantages and objects of the invention, as well as others which will become apparent, are attained and can be understood in detail, a more particular description of the invention briefly summaried above may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE INVENTION

Figure 1:
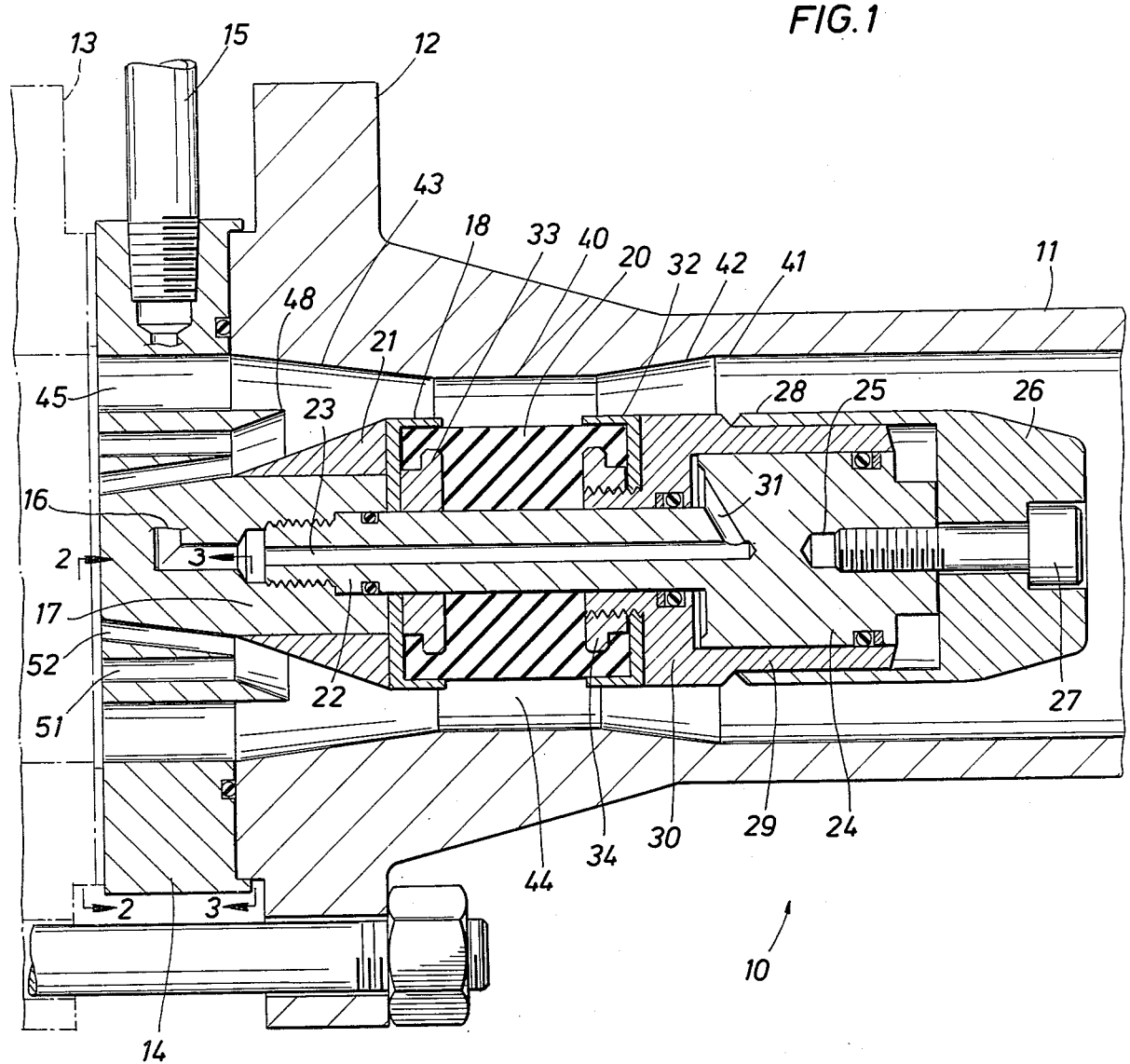
FIG. 1 is a transverse sectional view through the flow regulator of the present invention particularly showing details of construction of the passages therethrough for the regulated gas flow and particularly illustrating passages which redirect the downstream flume of regulated gas flow.

Attention is first directed to FIG. 1 of the drawings. In FIG. 1, the numeral 10 identifies the flow regulator of the present invention. It is shown in full line in the drawing. The numeral 11 identifies a pipe which encircles the flow regulator. The pipe is support structure, illustrating the environment in which the flow regulator 10 is installed. The context or setting for the apparatus will be described first. To this end, the pipe 11 terminates at a flange plate 12. The flange plate 12 serves as a clamp to secure the flow regulator 10 in location. The pipe 11 has a specified internal diameter and the flange plate 12 has a specified pressure rating and size. The flange plate 12 is immediately adjacent to a second flange plate 13. The flange plate 13 is constructed and arranged to capture the flow regulator 10 adjacent to it and against the flange plate 12. The flange plate 13 connects with another pipe (not shown) which extends further downstream, the two pipe preferably being of identical diameter. The upstream high pressure gas flow is from the right or upstream side of the flow regulator 10 and the regulated or reduced gas flow moves to the left as viewed in FIG. 1. This is achieved through operation of the flow regulator 10.

In FIG. 1, the flow regulator is constructed with a flange plate 14. The flange plate 14 is a transverse flat plate. It is positioned between the flange plates 12 and 13 and is sealed to them by means of suitable seals placed between them. The flange plate 14 is a means of anchoring and fastening the flow regulator 10 in location. It is captured between the plates and held securely by nuts and bolts illustrated in full line in FIG. 1. The flange plate 14 has an exposed peripheral face and a tapped opening is formed therein to receive a hydraulic fluid conduit 15. It connects through a passage 16. The passage 16 penetrates through the flange plate toward the center line of the flange plate and turns axially upstream of the apparatus. The flange plate 14 has a central enlargement or sub 17. The sub 17 is a generally cylindrical enlargement attached to it and extends towards the upstream side. It terminates at a cup 18. The cup 18 encompasses one end of an inner valve element 20. The inner valve element 20 is a cylindrical plug of rubber having a resiliency enabling it to swell and expand on compression. The plug 20 is formed of rubber, and has a durometer in the range of 30 to 90. The cup 18 is a transverse plate which has a peripheral lip around it which laps over the end of the resilient plug 20. The sub 17 supports a tapered sleeve 21. The sleeve 21 is on the exterior and fairs the flow path around the sub as will be described.

The sub 17 is drilled and counterbored. An elongate rod 22 is threaded into the counterbored central opening, and this defines an extension of the passage 16 which is identified by the numeral 23. The rod 22 is enlarged at 24, the enlargement 24 comprising a fixed piston. The piston is fixed in position inasmuch as the rod 22 is threaded to the sub 17 and held firmly thereagainst. The fixed piston 24 is axially drilled at 25, and a nose cone 26 is threaded to it by means of a bolt 27. The bolt is received into the tapped hole 25. The nose cover 26 defines a sheltered or covered cavity, the nose cone 26 incorporating a cylindrical skirt 28. The skirt 28 fits concentrically about a sleeve 29. The sleeve 29 fits around the fixed piston 24. The sleeve 29 moves to the left in conjunction with a cylinder head 30. The cylinder head 30 is attached to the sleeve 29. A chamber is defined between the piston 24 and the head 30. The chamber is defined between the facing shoulders and a lateral passage 31 communicates to the chamber from the axial passage 23. Hydraulic oil introduced under pressure flows from the line 15 through the passage 16 and to the extension thereof at 23. The oil then flows through the lateral passage 31 into the chamber provided for it. Under pressure, the chamber is expanded. The solid piston 24 cannot move. The cylinder head 30 moves to the left as viewed in FIG. 1. As it moves, it slides on the rod 22. Movement of the cylinder head 30 is coupled to the resilient body 20. The resilient body 20 is clamped by a second cup 32, the cups 18 and 32 being similarly constructed. They face one another and have external lips which surround the ends of the resilient body 20. This controls the portion of the body 20 which expands and directs expansion to the central portions thereof. It helps anchor the plug 20 in position.

The plug 20 is held in position by additional devices which anchor the ends of the plug. Specifically, each end of the plug is constructed by integrally bonding the plug during fabrication to transverse plates having protruding lips, the two plates being identified by the numerals 33 and 34. They are parallel to one another and spaced from one another. They are telescoped around the rod 22 to permit them to move toward one another on compression of the plug 20. It will be appreciated that movement is initiated from the right toward the left and expansion occurs in the central portions of the plug. Moreover, the compression impinging on the right hand end of the plug 20 is symmetrically reflected by expansion around the exterior. The plug 20 is held in position and maintains its desired or true shape when relaxed in large part assisted by the overhanging lips 33 and 34 which are cast integrally within the plug body.

As described to this juncture, hydraulic oil is delivered to the tool to achieve expansion of the resilient plug 20. The plug 20 swells radially outwardly around its circumference.

The flange plate 14 positions the plug concentrically within the surrounding tubular pipe portion 40. The pipe operates as a sleeve 40 positioned adjacent to and concentric around the plug 20. The portion 40 begins at a leading edge 41. This edge defines a machined area at a tapered surface 42, thereby delivering gas in laminar flow into an annular passage 44. The annular space 44 is inside the pipe portion 40 and on the exterior of the plug 20. The resilient plug is able to expand and restrict the annular flow space 44. This restriction is controlable inasmuch as the size of the plug is controlable. Regulation is achieved by this equipment in this manner.

Figure 2:
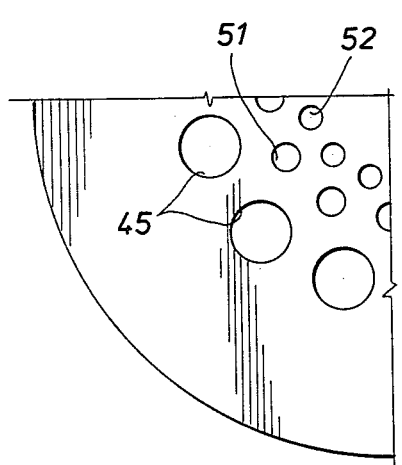
FIG. 2 is a sectional view along the line 2—2 of FIG. 1 which shows the arrangement of the outlets of the several passages through the flow regulator.
Figure 3:
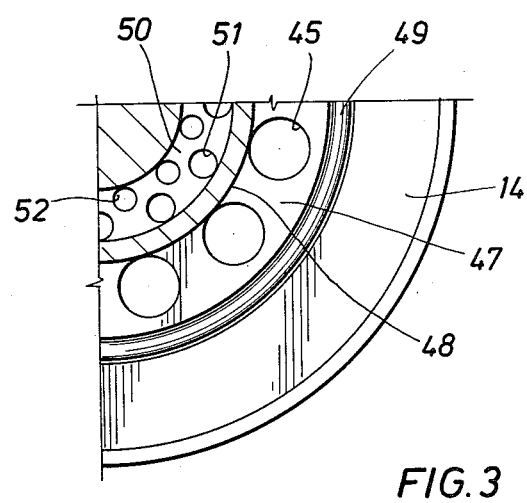
FIG. 3 is a sectional view looking along the line 3—3 of FIG. 1 which particularly illustrates the plurality of passages at the inlet end.

As gas flows past the plug 20 in its expanded state, the gas moves downstream. The faired sleeve 21 enlarges the gas flow volume in the annular space 44 as it moves to the left. The numeral 45 identifies one of many passages drilled through the flange plate 14. Moreover, the several passages 45 are arranged on a common circle. They are preferably identical and preferably evenly spaced around the circle. This distributes a laminar wave front next to the pipe wall downstream from the flange plate 14. The several passages are relatively close together so that a full circle may well include between 20, 30 or more drilled holes 45. It is understood that the number of drilled holes 45 may vary over a wide range and is dependent on scale factors which include the size of drilled holes 45 and the surface area of the flange plates 14. The drilled holes terminate at the downstream face of the plate so that the gas is unrestricted after it passes through the passages 45. The upstream end of the passage 45 is shown better in FIG. 3. There, it will be observed that the sectional line of FIG. 3 is parallel to the plate 14 and illustrates a circular shoulder area inside an O-ring 49. The shoulder area 47 is drilled at spaced locations with the several holes 45. The shoulder area 47 terminates at an internal upstanding edge 48 shown in FIG. 3. The edge 48 is better shown in FIG. 1 of the drawings where it extends forwardly to a relatively sharp edge. The sharp edge is the terminus of a tapered face which extends down to a second circular shoulder 50. The shoulder 50 is shown in FIG. 3. Moreover, the shoulder 50 is drilled with many passages there being an outer set of openings at 51. A smaller set of passages or openings is identified at 52. The passages 51 are relatively large in diameter compared with the passages 52. This is better illustrated in FIG. 1. There, the passages 51 extend approximately parallel to one another through the plate 14 and emerge on the downstream side. They collectively form a circle which is smaller than the circle of passages 45. They direct a flow of gas toward the center of the downstream pipe and thereby fill the central portions of the downstream flume to reduce eddy flows. The passsages 52 converge at a downstream point. They direct gas flow toward the center line path or axis. The passages 52 collectively come together if extended. This convergence of the several passages fills the central portions of the downstream pipe immediately behind the flange plate 14 to prevent eddy flow formation and to reduce downstream turbulence. As described to this juncture, the flange plate 14 includes the three sets of passages drilled in it. More or fewer sets of passages may be drilled through the flange plate 14 depending on the size of the passages and the surface area of the flange plate. Three sets are described herein for illustrative purposes only. The three sets of passages are included to pick up different portions of the gas flow and to deliver these portions of gas flow to different parts of the cross-sectional area of the downstream pipe. The bulk of the gas may very well flow through the passages 45 but that is not the end of the matter. The central portion of the cross-sectional area is filled with gas flow. The passages 51 and 52 assure this distribution. Moreover, the several sets of passages, being in the form of three circular groups of distributed passages, reduce downstream noise, and thereby smoothly carry the regulated gas flow away from the flange plate 14. This is better illustrated on referring to FIGS. 2 and 3. The manner in which this is accomplished will be understood more readily on viewing these drawings, to-wit: they illustrate a means whereby downstream gas flow distribution is accomplished.

An important feature of this disclosure is the modified pipeline. It will be observed that the pipeline is narrow beginning at 41. The tapered surface 42 is immediately upstream to the annular restriction 40. This construction technique enables the pipeline, itself, to function as the surrounding sleeve thereby defining the annular flow space. This is to be contrasted with the construction shown in applicant's copending application Ser. No. 205,287 filed on the same date as the present disclosure. It will be observed that the tapered surface 43 flares outwardly. Considering all of the surfaces on the pipe, the net result of the machining of the pipe is to form the tapered surface 43 at the very end of the pipe. The surface 40 is not tapered and is concentric compared with the exterior surface of the pipe. The tapered surface 43 is machined at the very end to leave the unmachined surface 40. The surface 42 is machined to slightly taper and terminates at the edge 41. This undercuts the pipe from the edge 41 to a place upstream of the flow regulator (off to the right of FIG. 1) where the undercut of the pipe terminates. Ideally, the undercut area upstream is also tapered slightly so that there is a relatively smooth transition. Undercutting of the pipe thins the wall but sharp edges are avoided to avoid stress concentrations in the pipe wall. The pipe wall is not cut so thin as to weaken it. The undercutting process is thus limited to define the taper area 42 which in absolute terms is a relatively small portion of the pipewall. Typically, the machining which defines the tapered wall 42 undercuts only a fraction of an inch.

The fractional cut in the wall of the pipe obtains a slight constriction in the annular flow path adjacent the regulating surface 40. This assures that laminar flow in the annular space occurs so that regulation is easily achieved by the flow regulator.

The modified flow regulator of this disclosure, in comparison with the flow regulator shown in the copending patent application, utilizes the pipeline as the surrounding sleeve to define the flow space where regulation occurs. After regulation has occurred, the gas flow moves past the resilient body 20 and flows through the openings drilled in the transverse flange plate 14. As amply discussed in the copending application, the several drilled holes in the flange plate comprise three groups. The outer or larger holes are arranged in a larger circle. They deliver a significant portion of the flowing gas near the wall of the downstream pipe. This establishes laminar flow adjacent to the wall. Additionally, there are passages drilled in smaller circles, and they assure the flow of gas in the central portions of the downstream area, thereby avoiding eddys and the creation of noise. Turbulance is reduced, and the apparatus operates in a markedly superior fashion. As will be understood from the copending disclosure, a fairly uniform wave front of gas flow is created. Moreover, noise and turbulance are reduced.

In operation, this structure is installed in a pipeline of specified rating. The device is installed between flange plates and left as a permanent regulatory apparatus. The installed flow regulator is operated by providing hydraulic oil under pressure to the line 15. The oil is regulated to a specified pressure to vary the expansion of the resilient plug 20. When the pressure is elevated, the hydraulic oil is delivered against the cylinder head 30 to force it to the left in FIG. 1, and the plug 20 is expanded. The plug 20, on expansion, restricts the gas flow through the annular flow space 44. The restricted flow is regulated to the desried flow volume. The maximum flow volume is controlled by the size of the cups 18 and 32 which clamp about the resilient body 20. When the body 20 is in the relaxed position shown in FIGS. 1 and 4, maximum flow volume is limited by the annular space defined between the cups 18 and 32 and the inner wall of the pipe 11. The restricted gas moves past the regulator 10, and begins to expand as the annular flow space increase in cross-sectional area. The gas flow is then delivered to the passages through the flange plate 14. The passages distribute the flow downstream to reduce turbulance. Moreover, they reduce noise as a result of the more uniform wave front of gas flowing downstream.

Figure 4:
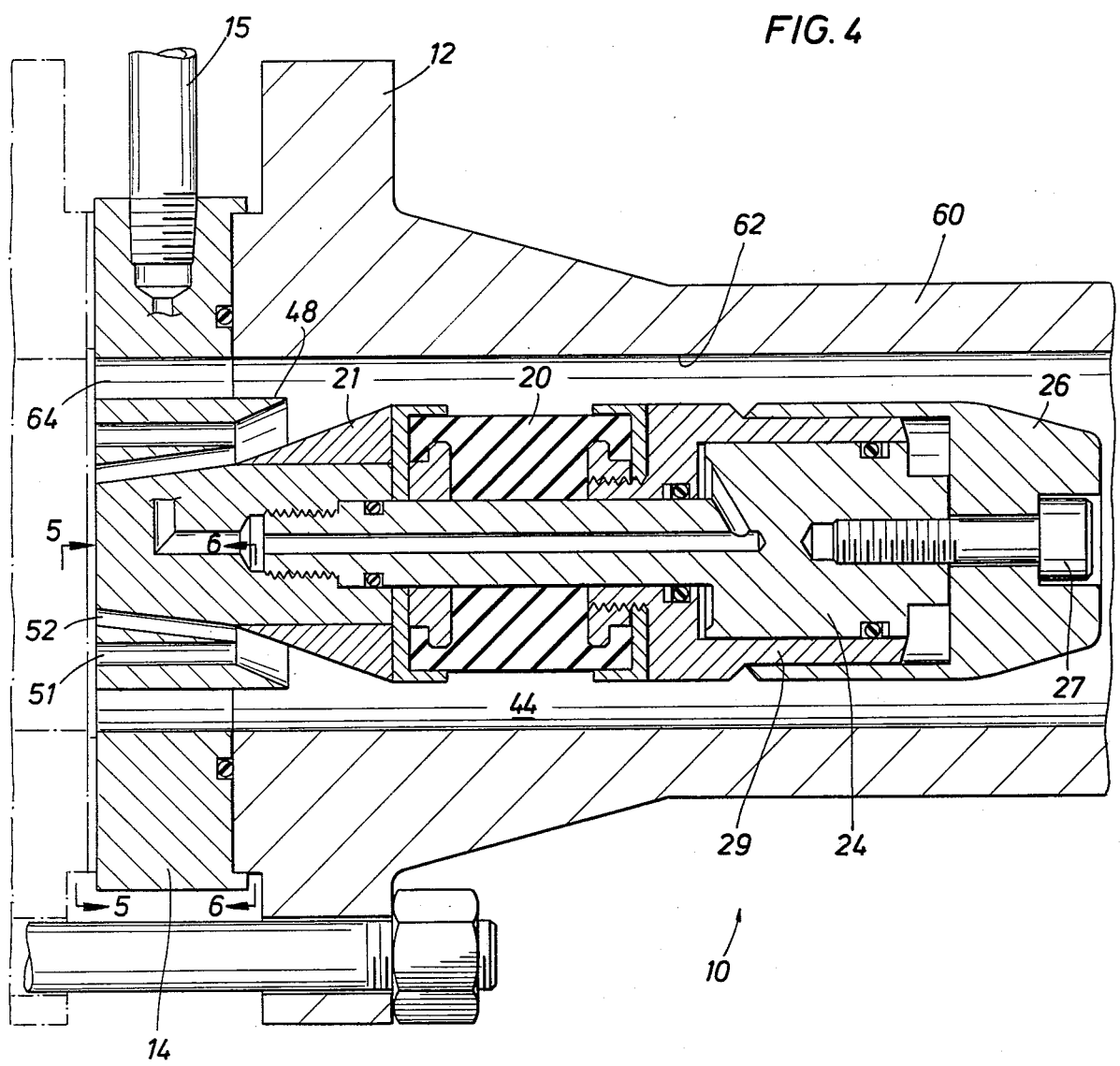
FIG. 4 is a transverse sectional view through the flow regulator of an alternate embodiment of the invention particularly showing details of construction of the passages therethrough for the regulated gas flow and particularly illustrating passages which redirect the downstream flume of regulated gas flow.
Figure 5:
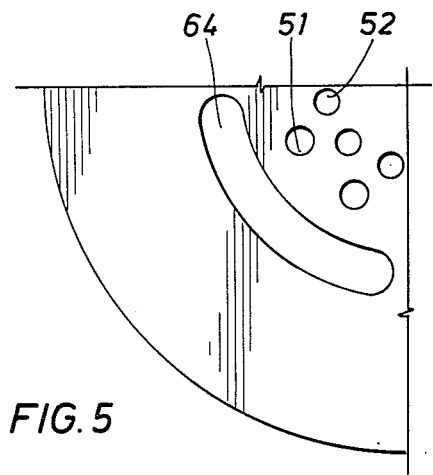
FIG. 5 is a sectional view along the line 5—5 of FIG. 4 which shows the arrangement of the outlets of the several passages through the flow regulator.
Figure 6:
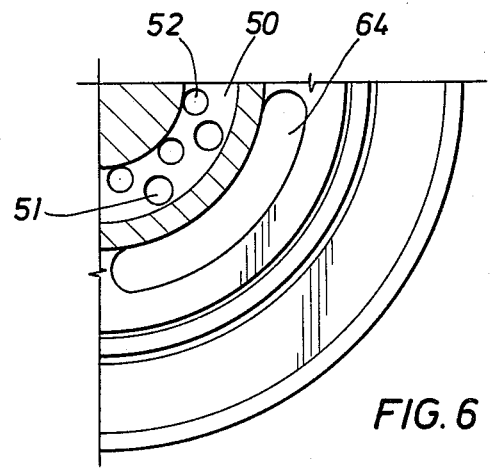
FIG. 6 is a sectional view along the line 6—6 of FIG. 4 which illustrates the plurality of passages at the inlet end of the flow regulator.

Turning now to FIGS. 4 through 6 of the drawings, an alternate embodiment of the invention is shown. In FIG. 4, the numeral 10 identifies the flow regulator of the alternate embodiment. Like reference numerals are employed to identify like elements in both the preferred and alternate embodiments. The numeral 60 identifies a pipe which encircles the flow regulator. The pipe is support structure, illustrating the environment in which the flow regulator 10 is installed. The pipe 60 is similar to the pipe 11 of the embodiment shown in FIG. 1. It will be observed, however, that the inner wall 62 of the pipe 60 is straight in comparison to the machined inner wall of the pipe 11. This embodiment is particularly useful in larger size pipe, for example, pipe having an internal diameter in the range of 4" to 8". This pipe size range is mentioned for illustrative purposes only and is not intended as a limitation. It is understood that the flow regulator of the invention may be utilized with different size pipe requiring only a change in scale factors for a specific pipe size. There is a considerable cost savings in the manufacture of the flow regulator of FIG. 4 in that the cost of machining the pipe is eliminated.

Referring now specifically to FIGS. 5 and 6, an alternate embodiment of the flow passages extending through the flange plate 14 is shown. The flow passages may be drilled holes identified as 51 and 52 or slots identified by numeral 64. Other flow passage shapes may also be employed, however, holes or slots are preferred. The number of passages may vary depending on scale factors such as passage size and flange plate area.

While the foregoing is directed to the preferred embodiment of the present invention, other and further embodiments of the invention may be devised without departing from the basic concept thereof, and the scope thereof is determined by the claims which follow.

I claim:

1. A gas line flow regulator which comprises:
   (a) a flange held radially extending transverse plate supported within a pipeline having upstream and downstream faces thereon;
   (b) a centrally positioned means supported by said transverse plate on the upstream side thereof for regulating the flow of gas through the pipeline, said means including:
   1. an elongate centered body;
   2. a resiliently expandable means supported by said body having a relaxed and expanded condition wherein the expanded condition is accompanied by a radial outward expansion of said expandable means, and wherein said expandable means further includes;
   3. an exposed outer sealing surface thereon;
   (c) spaced sealing surface means defined by the inner wall of the pipeline adjacent to said expandable means positioned within the pipeline to define an annular flow space therebetween which is variably constricted by said expandable means on expanding;
   (d) said transverse plate terminating said flow space and having openings therethrough, there being a first opening means for directing flowing gas in a first direction downstream from said transverse plate and a second opening means therethrough for directing flowing gas in a second direction downstream from said transverse plate; and
   (e) wherein said first opening means comprise a plurality of holes drilled through said transverse plate, said holes having inlet openings arranged on a circle, and wherein said second opening means comprise a plurality of holes drilled through said transverse plate arranged on a second circle which is larger than the first circle, and said first opening means are directed toward a point of intersection which, if extended downstream of said transverse plate, would intersect within the second circle.

2. The apparatus of claim 1 wherein said transverse plate incorporates first, second and third opening means therethrough wherein said first, second and third opening means are arranged serially outwardly from the center of said transverse plate.

3. The apparatus of claim 1 wherein said expandable means is positioned adjacent to said spaced sealing surface means and said annular flow space is further defined by a flared and tapered surface located on a surrounding portion of the inner wall of the pipeline adjacent to said sealing surface means.

4. The apparatus of claim 1 wherein said first and second opening means comprises a plurality of slots drilled through said transverse plate.

* * * * *